(12) United States Patent
Sun et al.

(10) Patent No.: US 12,134,230 B2
(45) Date of Patent: Nov. 5, 2024

(54) 3D PRINTING SYSTEM AND METHOD

(71) Applicant: Nissan North America, Inc., Franklin, TN (US)

(72) Inventors: Cheng Sun, Wilmette, IL (US); Rihan Hai, Evanston, IL (US); Nanzhu Zhao, Novi, MI (US); Sandeep Patil, Farmington Hills, MI (US)

(73) Assignees: Nissan North America, Inc., Franklin, TN (US); Northwestern University, Evanston, IL (US)

( * ) Notice: Subject to any disclaimer, the term of this patent is extended or adjusted under 35 U.S.C. 154(b) by 0 days.

(21) Appl. No.: 17/463,479

(22) Filed: Aug. 31, 2021

(65) Prior Publication Data

US 2023/0067468 A1    Mar. 2, 2023

(51) Int. Cl.
| | |
|---|---|
| *B33Y 10/00* | (2015.01) |
| *B29C 64/124* | (2017.01) |
| *B29C 64/277* | (2017.01) |
| *B29C 64/30* | (2017.01) |
| *B29C 64/393* | (2017.01) |
| *B33Y 30/00* | (2015.01) |
| *B33Y 40/20* | (2020.01) |
| *B33Y 50/02* | (2015.01) |

(52) U.S. Cl.
CPC .......... *B29C 64/277* (2017.08); *B29C 64/124* (2017.08); *B29C 64/30* (2017.08); *B29C 64/393* (2017.08); *B33Y 10/00* (2014.12); *B33Y 30/00* (2014.12); *B33Y 40/20* (2020.01); *B33Y 50/02* (2014.12)

(58) Field of Classification Search
None
See application file for complete search history.

(56) References Cited

U.S. PATENT DOCUMENTS

| | | | |
|---|---|---|---|
| 10,016,938 B2 | 7/2018 | DeSimone et al. | |
| 2018/0207865 A1* | 7/2018 | Tyler | B33Y 40/20 |
| 2020/0223142 A1* | 7/2020 | Costabeber | B29C 35/0888 |
| 2021/0268743 A1* | 9/2021 | Myllyla | B33Y 10/00 |
| 2022/0134657 A1* | 5/2022 | Schmidt | B29C 64/35 |
| | | | 264/401 |

FOREIGN PATENT DOCUMENTS

| | | | | |
|---|---|---|---|---|
| DE | 112018007235 T5 * | 12/2020 | ........ | B29C 64/135 |
| KR | 101772996 B1 * | 4/2016 | | |
| KR | 102248644 B1 * | 8/2017 | | |
| KR | 102447555 B1 * | 8/2021 | | |

* cited by examiner

*Primary Examiner* — Yung-Sheng M Tsui
*Assistant Examiner* — Melody Tsui
(74) *Attorney, Agent, or Firm* — Global IP Counsels, LLP (57) ABSTRACT

A 3D printing system includes a vat containing a liquid photopolymer resin and a rigid base on which an object is configured to be printed. A control arm connected to the rigid base is configured to move the rigid base relative to the vat. A first light source is configured to emit light to the vat to form the object on the rigid base. A second light source is configured to emit light on the object externally of the liquid photopolymer resin in the vat to cure the object.

20 Claims, 6 Drawing Sheets

3D PRINTING SYSTEM AND METHOD

BACKGROUND

Field of the Invention

The present invention generally relates to a system and method of 3D printing. More specifically, the present invention relates to a 3D printing system and method including a first light source configured to form an object in a resin vat and a second light source configured to cure the formed object externally of the resin in the vat.

Background Information 3D (three-dimensional) printing is the construction of a three-dimensional object from a digital file, such as a CAD model or a digital 3D model. A conventional additive manufacturing process creates the object by successively adding layers one at a time until the object is complete. One type of additive manufacturing process is vat polymerization, which includes stereolithography (SLA) and digital light processing (DLP) processes.

Figure 1:
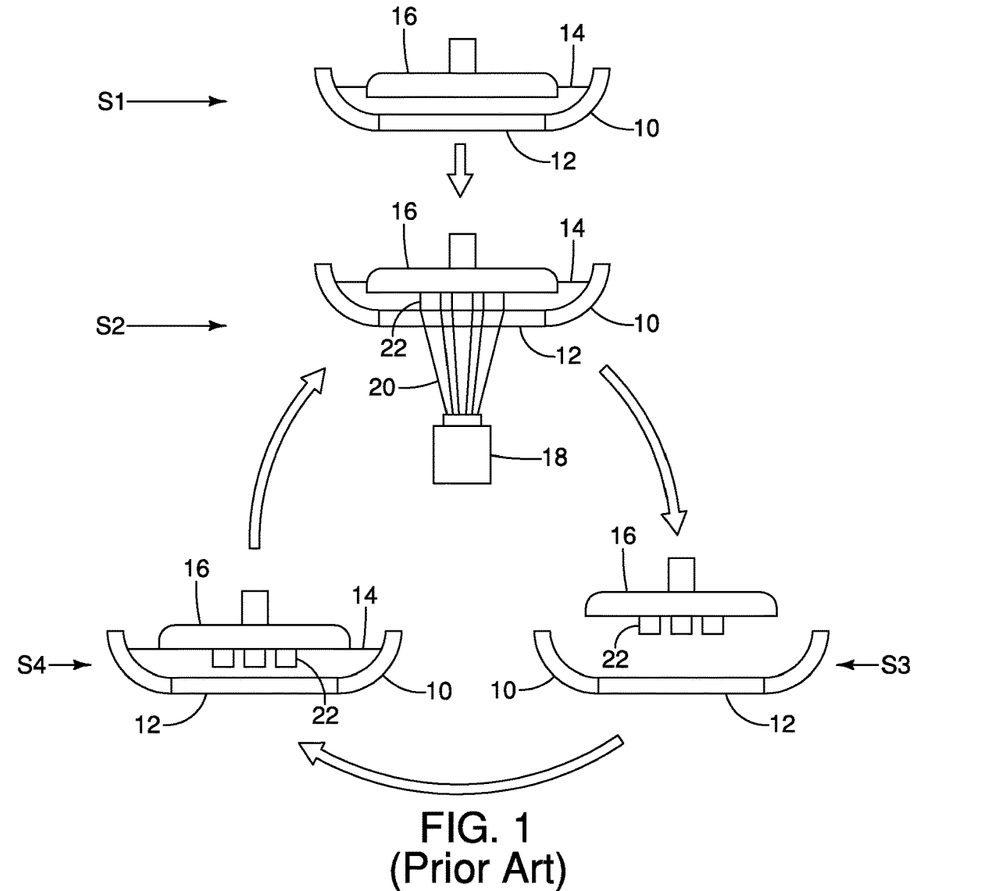
FIG. 1 is a schematic representation of a conventional 3D printing system and method.

As shown in step S1 of FIG. 1, DLP 3D printing includes a vat, or tank, 10 having a transparent projection window 12. The vat 10 contains a liquid polymer resin 14. A build platform 16, on which an object is to be printed, is lowered into the resin 14.

A light projection system 18, such as a laser or projector, emits a light 20, such as ultraviolet light, through the transparent projection window 12 in the vat 10, as shown in Step S2 of FIG. 1. The emitted light 20 causes a reaction within the resin 14 in which the molecules bond together, or cure, to form a first layer of a solid object 22 on the build platform 16. The entire first layer is cured simultaneously. The build platform 16 is moved in a direction away from the transparent projection window 12 to form a second layer on the first layer. Layers are formed, one layer at a time, until the object is printed.

During the printing process, the polymerized resin can adhere to the transparent projection window 12 of the vat 10, which can interfere with forming additional layers on the build platform 16. Additionally, the gap between the build platform 16 and the transparent window 12, or between the formed solid object 22 on the build platform 16 and the transparent window 12 for subsequent layers, is small (e.g., a distance substantially equal to a thickness of one formed layer on the build platform). As shown in step S3 of FIG. 1, the build platform 16 is removed from the vat 10. Any polymerized resin adhered to the transparent window 12 of the vat 10 can be removed, and additional liquid polymer resin 14 can be added to the vat 10.

As shown in step S4 of FIG. 1, the build platform 16 is lowered into the liquid polymer resin 14 in the vat 10 until the appropriate distance between the printed object 22 and the transparent window 12 is obtained. The separation step of the build platform 16 from the vat 10 in step S3 and repositioning the build platform 16 in the vat 10 in step S4 are time consuming steps that slow down the DLP 3D printing process.

Figure 2:
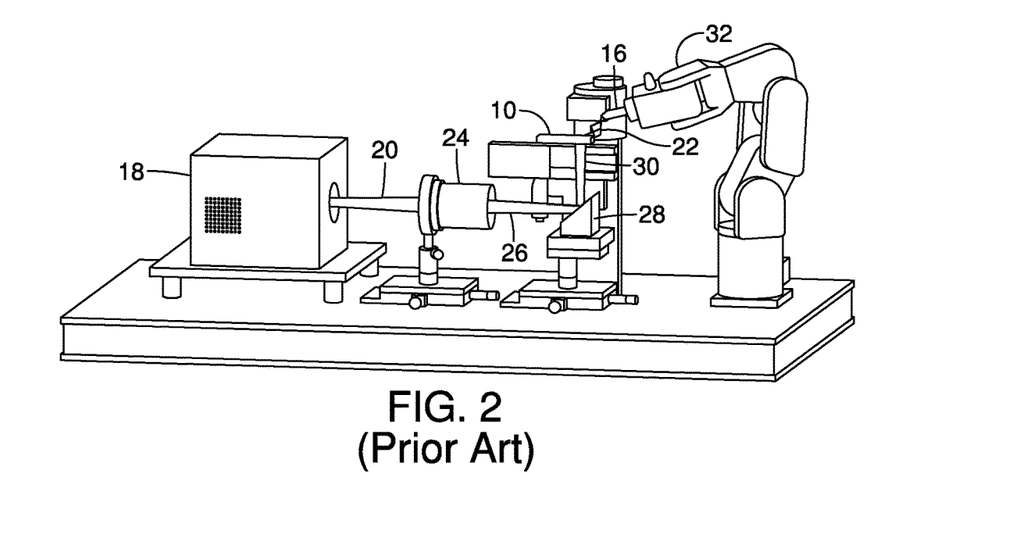
FIG. 2 is a perspective view of a conventional 3D printing system of FIG. 1.

A conventional 3D printing system used in the DLP 3D printing process of FIG. 1 is shown in FIG. 2. The light projection system 18 emits light, such as UV (ultraviolet) light, corresponding to a single image of the layer to be formed on the build platform 16. The emitted light 20 passes through a projection lens 24 to adjust the resolution of the emitted light 20. The projection lens 24 is selected based on the desired focal depth, such as 30 or 100 micrometers. The projected light 26 is transmitted to a mirror 28. The reflected light 30 is transmitted into the vat 10 through a transparent window 12 (FIG. 1) thereof. The reflected light 30 cures the resin in the vat 10 to form a first layer of the printed object 22. A robotic arm 32 moves the build platform 16 such that successive layers can be formed to construct the printed object 22.

Figure 3A:
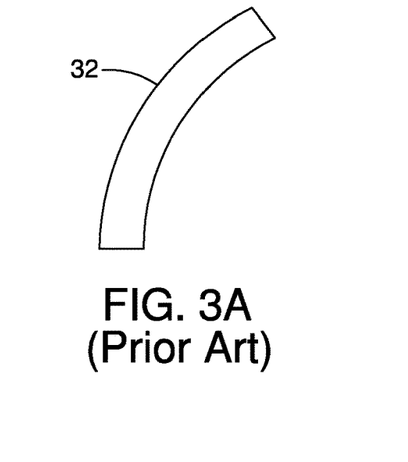
FIGS. 3A-3E are schematic illustrations of printing paths using conventional 3D printing systems.
Figure 3B:
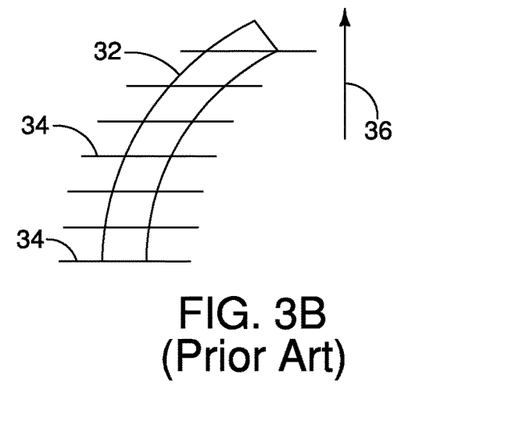
Figure 3C:
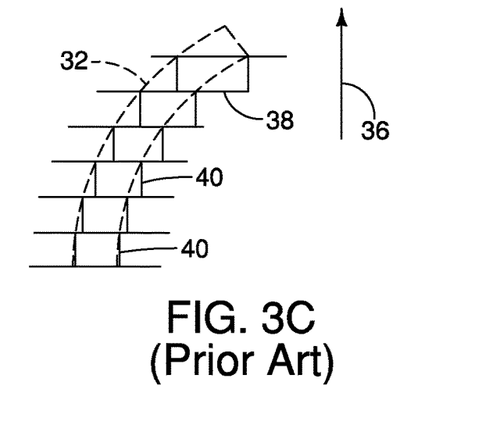

A model 32 of a 3D object to be printed is shown in FIG. 3A. A conventional 3D printing system models the object with slicing layers 34 formed perpendicular to the printing path 36, as shown in FIG. 3B. The slicing layers 34 correspond to the thickness of the layer to be printed. The printing path 36 is vertical, which is the direction that the build platform 16 (FIG. 1) is moved during the printing process. The printed object 38 is shown in FIG. 3C. The vertical printing path 36 results in successive layers of blocks 40 having a stair-step shape that form the printed object 38. Post-printing manipulation of the printed object 38 is required to obtain the desired surface finish of the model 32, which is shown in dashed lines in FIG. 3C.

Figure 3D:
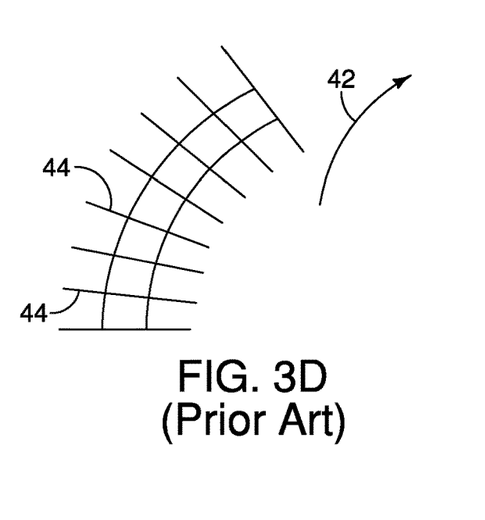
Figure 3E:
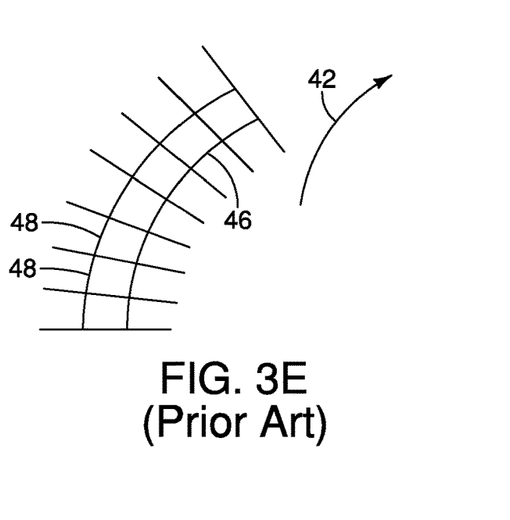

In FIG. 3D, a curvilinear printing path 42 is obtained when the arm 32 (FIG. 2) has multiple degrees of freedom. The slicing layers 44 are formed perpendicularly to the printing path 42, but have two-dimensions in view of the printing path 42 being curvilinear. In other words, the slicing layers extend in the X and Y directions. As shown in FIG. 3E, the resulting printed object 46 is formed of successive blocks 48 more closely adhering to the shape of the model 32 (FIG. 3A).

Liquid resin 14 from the vat 10 can adhere to the printed object as the build platform 16 moves away from the transparent projection window 12 of the vat 10. Additionally, as shown in FIGS. 3A-3E, the layering, or additive, printing process can result in the printed object having rough surfaces. Additional processing of the printed object is required to remove adhered resin from the printed object and to smooth any rough surfaces.

SUMMARY

In view of the state of the known technology, one aspect of the present disclosure is to provide a 3D printing system including a vat containing a liquid photopolymer resin and a rigid base on which an object is configured to be printed. A control arm connected to the rigid base is configured to move the rigid base relative to the vat. A first light source is configured to emit light to the vat to form the object on the rigid base. A second light source is configured to emit light on the object externally of the liquid photopolymer resin in the vat to cure the object.

Another aspect of the present invention is to provide a method of 3D printing an object. Light is guided from a first light source to a vat containing a liquid photopolymer resin. The liquid photopolymer resin is cured to form a first layer of the object on a rigid base. The rigid base is moved to form a second layer of the object on the first layer. Light is emitted from a second light source to cure the object on the rigid base externally of the liquid photopolymer resin in the vat.

Also other objects, features, aspects and advantages of a 3D printing system and method will become apparent to those skilled in the art from the following detailed description, which, taken in conjunction with the annexed drawings, discloses exemplary embodiments of the 3D printing system and method.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 4:
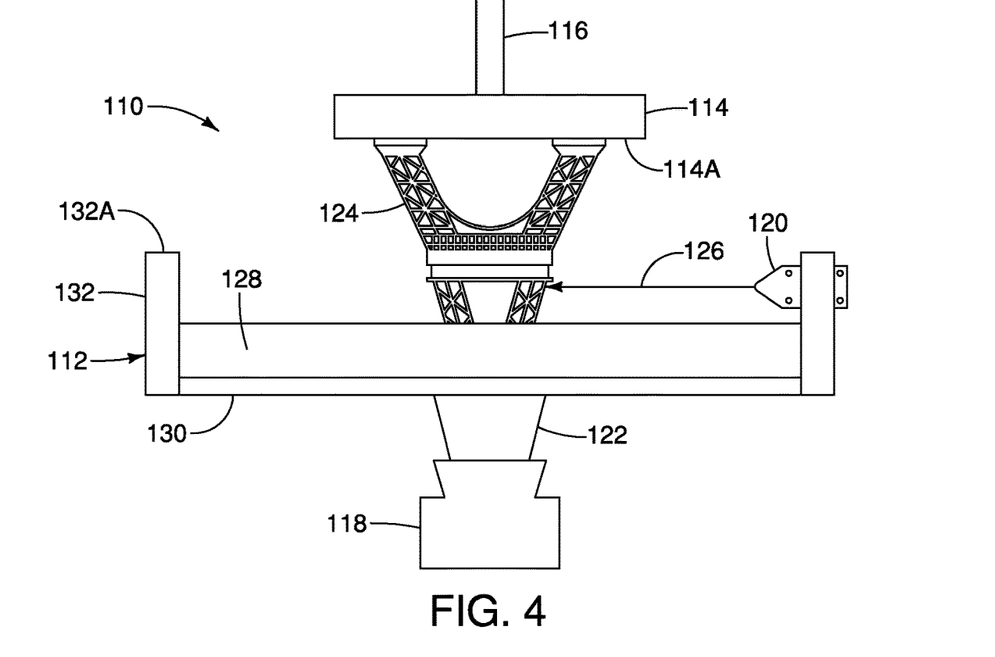
FIG. 4 is an elevational view of a 3D printing system in accordance with an exemplary embodiment of the present invention.
Figure 5:
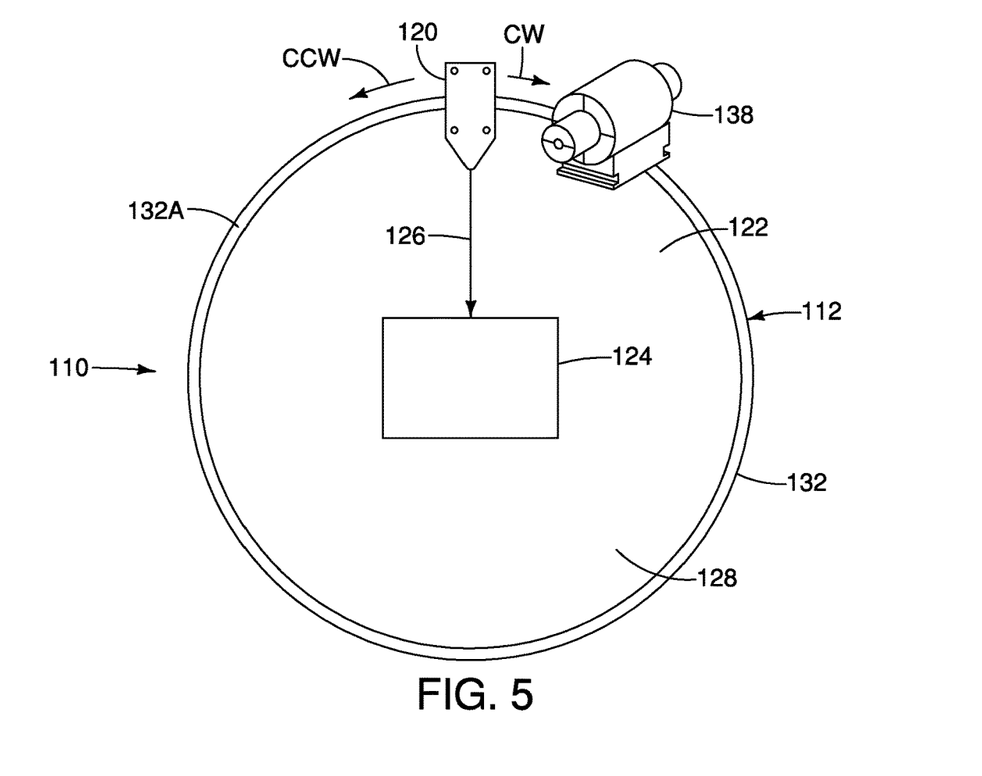
FIG. 5 is a top plan view of the 3D printing system of FIG. 4.
Figure 6:
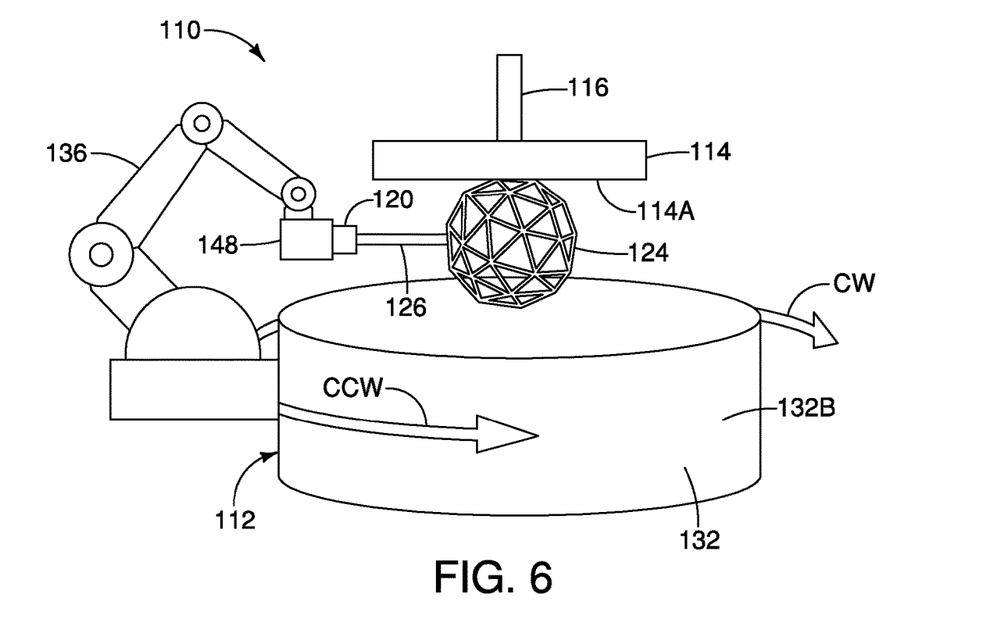
FIG. 6 is a perspective view of the 3D printing system of FIG. 4.

Referring initially to FIGS. 4-6, a 3D printing system 110 in accordance with an exemplary embodiment includes a vat 112, a rigid base 114, a control arm 116, a first light source 118, and a second light source 120. The rigid base 114 has a print surface 114A on which an object is configured to be printed. The control arm 116 is connected to the rigid base 114 to move the rigid base 114 relative to the vat 112. The first light source 118 is configured to emit light 122 to the vat 112 to form a printed object 124 on the rigid base 114. The second light source 120 is configured to emit light 126 on the printed object 124 externally of the liquid polymer resin 128 in the vat 112 to fully cure and smooth the printed object 124. A sensor 138 is configured to acquire data regarding the printed object 124. The second light source 120 is configured to be controlled based on the data acquired by the sensor 138.

The vat 112 contains a liquid photopolymer resin 128, as shown in FIGS. 4 and 5. The vat 112 can be any suitable shape to hold the resin 128 therein. As shown in FIG. 5, the vat 112 is substantially circular. The vat 112 has a base 130 and a side wall 132 extending upwardly from the base 130. The base 130 is preferably transparent such that the light 122 emitted from the first light source 118 can pass through the base 130. As shown in FIG. 4, the entire base 130 can be transparent. Alternatively, a portion of the base 130 can be transparent.

The rigid base, or build platform, build plate or print bed, 116 provides the surface 114A on which the object 124 is printed. The print surface 114A is preferably a planar surface, as shown in FIG. 4. The rigid base 114 can be made of any suitable material, such as plastic, such as polylactic acid (PLA), or glass.

Figure 8:
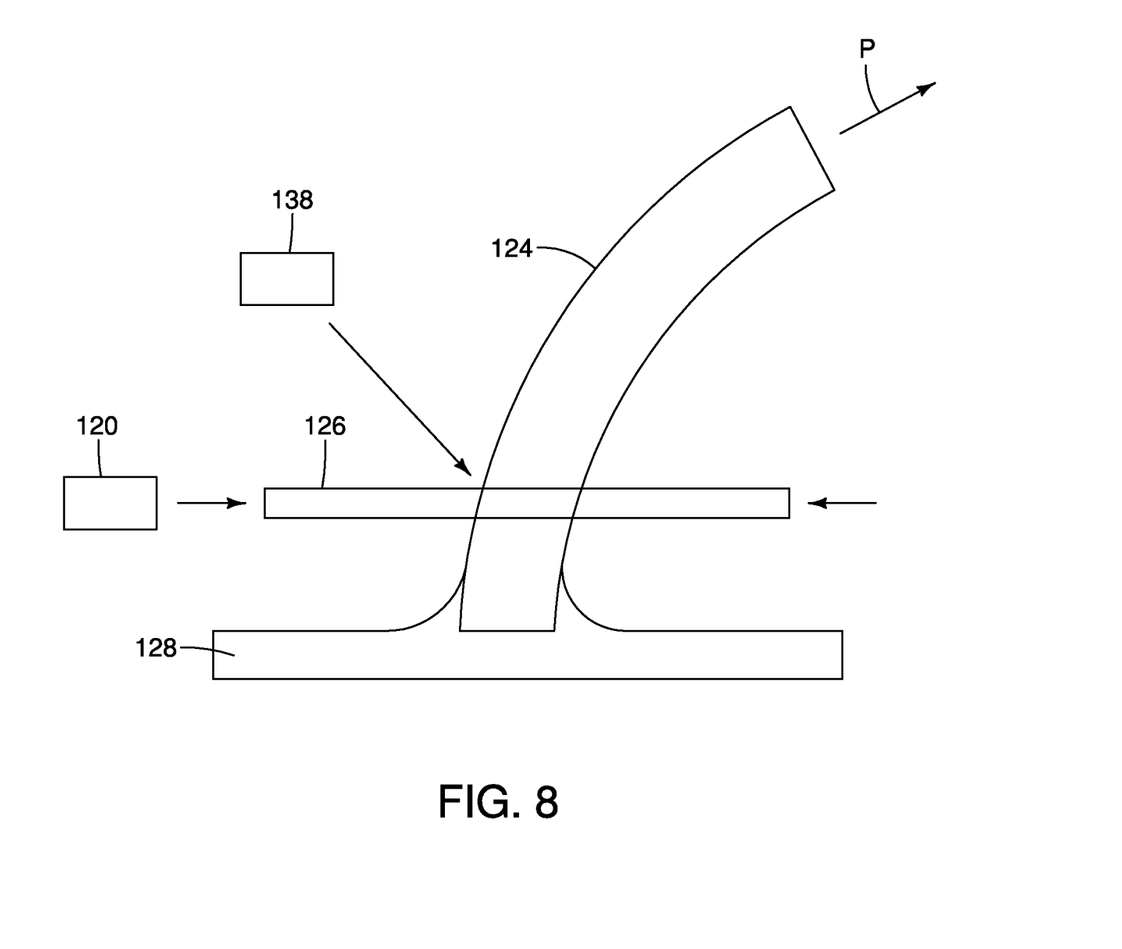
FIG. 8 is a schematic illustration of the 3D printing system of FIG. 4.

The control arm 116 is connected to the rigid base 114 to control movement and positioning of the rigid base 116 during the printing process. As shown in FIG. 6, the control arm 116 can have six degrees of freedom, such that the rigid base can move through a curvilinear path P, as shown in FIG. 8.

The first light source 118 emits light 122 to cure the resin 128 in the vat 112. The first light source 118 preferably emits UV light 126 having a wavelength between approximately 10 and 400 nanometers, inclusive. Preferably, the emitted UV light 126 has a wavelength between approximately 380 and 400 nanometers, inclusive. Light having any suitable wavelength can be used, such as, but not limited to, UV, visible and infrared light.

The liquid polymer resin 128 is selectively cured by light-activated polymerization, such as by photopolymerization, which preferably uses visible or UV light, although light having any suitable wavelength can be used, to form in situ cross-linked polymer structures. The liquid polymer resin 128 preferably includes monomer and oligomer molecules that are converted to solid polymers during photopolymerization when the light 122 emitted by the first light source 118 is guided through the transparent portion of the base 130 of the vat 112.

The liquid polymer resin 128 includes a first photoinitiator and a second photoinitiator. The first photoinitiator initiates photopolymerization in the vat 112 when the light 122 emitted by the first light source 118 passes through the transparent portion of the base 130 of the vat 112. The first photoinitiator absorbs light energy having a first wavelength. The second photoinitiator absorbs light energy having a second wavelength. Preferably, the first photoinitiator and the second photoinitiator absorb light energy having different wavelengths. The first photoinitiator preferably absorbs light energy having a wavelength between approximately 360 and 400 nanometers, inclusive, such that the first photoinitiator initiates polymerization in the vat 112 when the first light source 118 emits the light 122 to the vat 112. The second photoinitiator preferably absorbs light energy having a wavelength less than 360 nanometers, such that the second photoinitiator is not activated by the light 122 emitted by the first light source 118. The first photoinitiator is configured to absorb light energy from light emitted by the first light source 118. The second photoinitiator is configured to absorb light energy from light 126 emitted by the second light source 120. The first and second photoinitiators are preferably selected based on the wavelengths of the light emitted by the first and second light sources 118 and 120.

The control arm 116 is connected to the rigid base 114 to move the rigid base 114 relative to the vat 112. The control arm 116 is preferably a robotic arm having six degrees of freedom. The six degrees of freedom are movements along the three axes (i.e., the X, Y and Z axes), and rotation about each of the three axes (i.e., pitch, roll and yaw). Providing the arm with multiple degrees of freedom, such as six degrees of freedom, allows the control arm 116 to move the rigid base 114 through a curvilinear path P (FIG. 8), including moving the rigid base 116 to a plurality of positions, thereby allowing a more accurate object 124 to be printed.

The second light source 120 is movably disposed relative to the vat 112 and relative to the printed object 124, as shown in FIGS. 4-6, such that the second light source 120 is movable around an entire perimeter of the vat 112 such that an entirety of the printed object 124 is accessible to the light 126 emitted by the second light source 120. As shown in FIGS. 5 and 6, the second light source 120 can move in the clockwise (CW) direction and the counter-clockwise (CCW) direction. The second light source is disposed above an upper surface 132A of the side wall 132 such that the light 126 emitted by the second light source 120 is projected to the printed object 124.

The second light source 120 can be disposed in any suitable manner that allows movement of the second light source relative to the vat 112. As shown in FIG. 5, the second light source 120 can be connected to the upper surface 132A of the side wall 132. As shown in FIG. 6, the second light source 120 can be connected to the outer surface 132B of the side wall 132. The second light source 120 can be connected to a control arm 136, such as a robotic arm, having multiple degrees of freedom, such as six degrees of freedom, to more precisely position the second light source 120. The movement of the second light source 120 around the vat 112 in addition to the movement provided by the control arm allows the second light source 120 to project the light 126 to any portion of the printed object 124 externally of the liquid polymer resin 128 in the vat 112.

The second light source 120 preferably emits light 126 at a different wavelength than the light 122 emitted by the first light source 118, although the second light source 120 can emit light 126 having the same wavelength as the light 122 emitted by the first light source 118. The second light source 120 preferably emits light 126 at a wavelength less than 360 nanometers. Alternatively, the second light source 120 emits light 126 having a wavelength larger than the wavelength of the light emitted by the first light source 118. The second light source 120 is configured to emit light 126 on the printed object 124 externally of the liquid polymer resin 128 to further cure the printed object 124, as shown in FIGS. 4-7. The light 126 emitted by the second light source 120 initiates the second photoinitiator in the uncured resin adhering to portions of the printed object 124 externally of the liquid polymer resin 128 in the vat 112. As shown in FIGS. 4 and 6, the light 126 emitted by the second light source 120 initiates further curing and smoothing of the uncured resin adhering to the printed object 124 on portions of the printed object 124 that have been pulled out of the liquid polymer resin 122 in the vat 112 by the control arm 116 connected to the rigid base 114.

Figure 7:
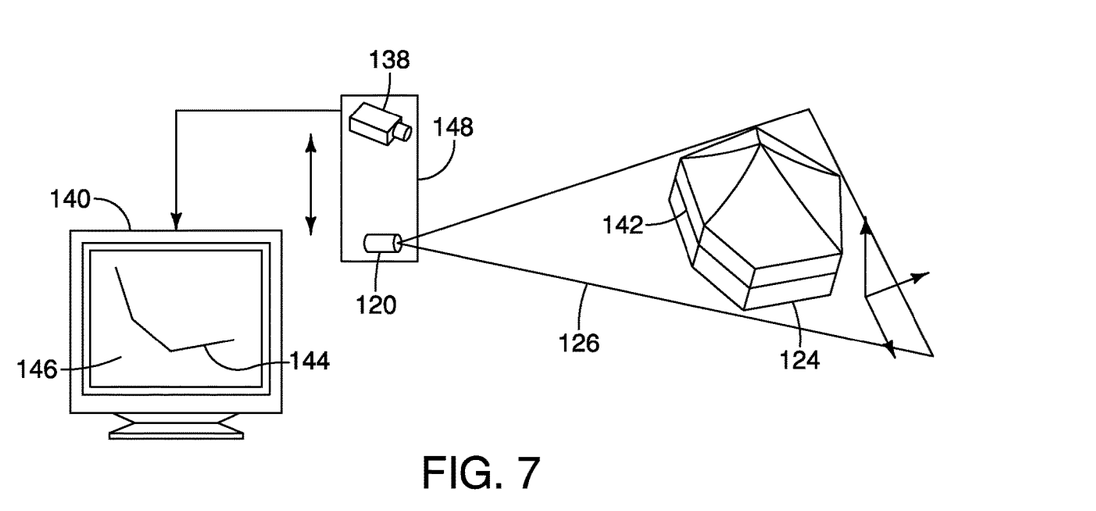
FIG. 7 is a schematic representation of an inspection system of the 3D printing system of FIG. 4.

A sensor 138 is configured to acquire data regarding the printed object 124, as shown in FIGS. 5, 7 and 8. The sensor 138 can be any suitable sensing device or camera, such as a complementary metal oxide semiconductor (CMOS) or a charge-coupled device (CCD) camera, configured to detect distances such that the surface of the printed object 124 can be inspected for dimensional accuracy. As shown in FIG. 7, the second light source 120 and the sensor 138 can be disposed in a housing or on a platform 148 such that the control arm 126 moves the second light source 120 and the sensor 138 together relative to the vat 112 and the printed object 124. Alternatively, the sensor 138 can be independently controlled to move relative to the vat 112 and the printed object 124 similarly to the second light source 120.

As shown in FIG. 7, the sensor 138 transmits the acquired information to a computer 140 to determine whether a measured portion 142 of the printed object 124 is within a predetermined tolerance of the corresponding portion 144 of the model being printed. The corresponding portion 144 of the model can be displayed on a display screen 146 of the computer 140. The computer 140 controls the second light source 120 based on the data acquired by the sensor 138, thereby creating real-time feedback control ensuring the accuracy of the printed object 124. The feedback control allows the second light source 120 to fully cure and smooth out the portion 142 of the printed object 124 to more accurately correspond to the portion 144 of the model being printed. The feedback control fully cures and smooths out the printed object 124 as the printed object 124 is pulled out of the liquid polymer resin 128 in the vat 112. The data, such as distance measurements, acquired by the sensor 138 provides feedback to fine tune the process parameters of the curing of the printed object 124 with the light 126 projected by the second light source 120.

The liquid polymer resin 128 can further include a light absorbing material, such as a UV absorber, to facilitate curing the printed object 124 as the printed object 124 is pulled out of the liquid polymer resin 128 in the vat 112. The light absorbing material absorbs emitted light when the printed object 124 is pulled out of the liquid polymer resin 128 in the vat 112 to limit the penetration depth of the light 126 emitted by the second light source 120.

As shown in FIG. 4, the printed object 124 is formed on the surface 114A of the rigid base 114. The printed object 124 is based on a model supplied to a computer 140 (FIG. 7) that controls the 3D printing process. The light 122 from the first light source 118 is guided to the vat 112 to cure the liquid polymer resin 128 on the surface 114A of the rigid base 114 to form a first layer of the printed object 124. The control arm 116 is connected to the rigid base 114 to move the rigid base 114 relative to the vat 112 in a direction away from the transparent portion of the base 130. The rigid base is moved a distance approximately equal to a thickness of the formed layer. The light 122 is emitted from the first light source 118 to cure the liquid polymer resin 128 in the vat 112 to form a second layer on the first layer. This process is repeated until the entire object is printed. When the printing is complete, the printed object 124 can be removed from the print surface 114A of the rigid base 114.

The second light source 120 is controlled based on information detected by the sensor 138 to fully cure and to smooth the surface of the printed object 124 as the printed object is pulled out of the liquid polymer resin 128 in the vat 112, as shown in FIGS. 4-6 and 8. The sensor 138 acquires information regarding the printed object 124, such as a distance, such that real-time feedback control of the second light source 120 provides full curing and smoothing of the surface of the printed object 124 while the printed object is connected to the rigid base 114. The printed object 124 is removed from the rigid base 114 when the second light source 120 completes the full curing and smoothing of the printed object 124.

Figure 9:
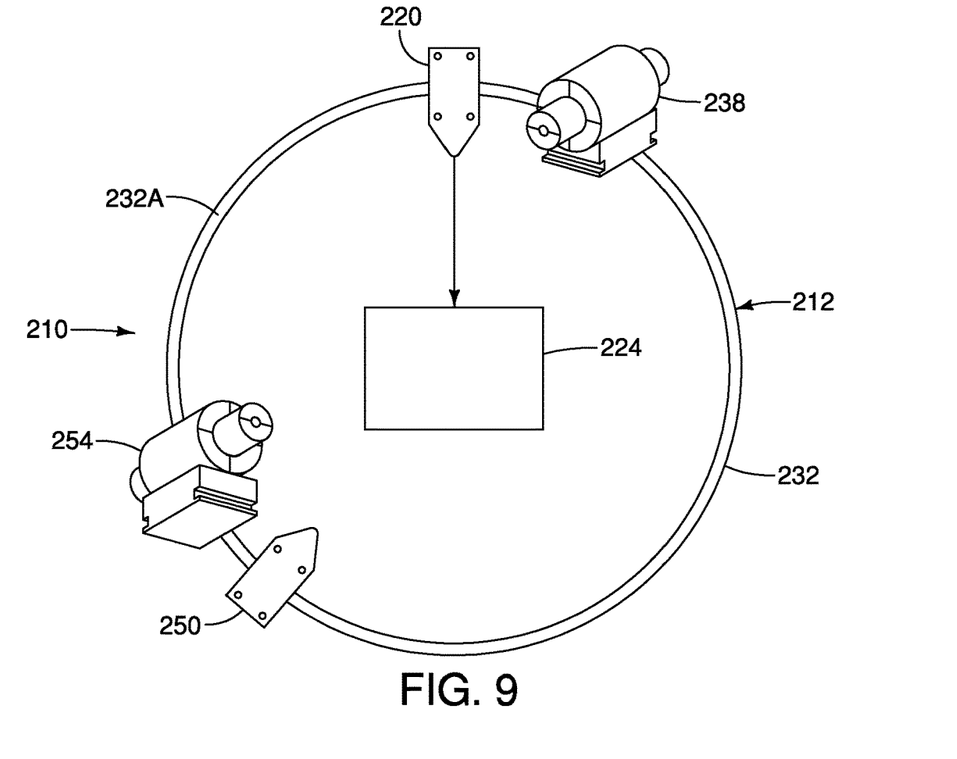
FIG. 9 is a top plan view of a 3D printing system in accordance with another exemplary embodiment of the present invention.
Figure 10:
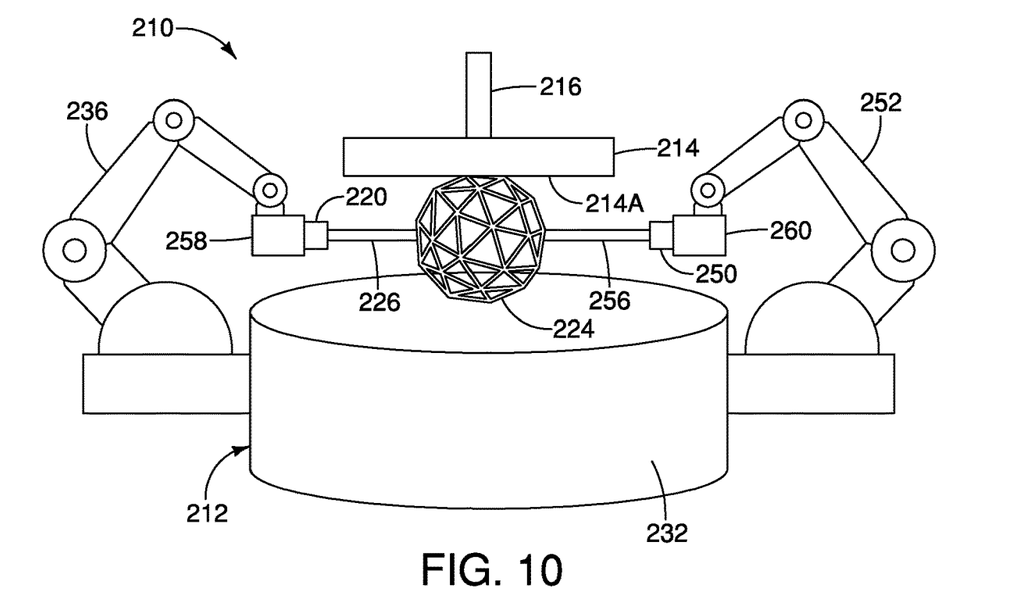
FIG. 10 is a perspective view of the 3D printing system of FIG. 9.

As shown in FIGS. 9 and 10, a 3D printing system and method 210 in accordance with another illustrated exemplary embodiment is substantially similar to the 3D printing system and method 110 of the exemplary embodiment illustrated in FIGS. 4 to 8 except for the differences described below. Similar parts are identified with similar reference numerals, except increased by 100 (i.e., 2xx, accordingly).

The 3D printing system and method 210 of FIGS. 9 and 10 includes a pair of second light sources 220 and 250. Each of the second light sources 220 and 250 is connected to a control arm 236 and 252, respectively, that allows each of the second light sources 236 and 252 to cover approximately 180 degrees of the printed part 224. By adding an additional second light source 250, each of the bases of the second light sources is fixedly mounted to not rotate about the vat 212. The second light sources 220 and 250 can be fixed to a side wall 232 of the vat 212, as shown in FIG. 10, or any other suitable location. The control arms 236 and 252 move the second light sources 220 and 250, respectively, to cover approximately half (i.e., approximately 180 degrees) of the printed object 224.

Each of the second light sources 220 and 250 includes a sensor 238 and 254, respectively. Each of the second light sources 220 and 250 and corresponding sensors 238 and 254 can be mounted together in a housing 258 and 260, respectively, or can be independently controlled. As the control arm 216 pulls the rigid base 214 out of the resin in the vat 212, the sensors 238 and 254 acquire data regarding the printed object 224. The acquired data is transferred to a computer 140 (FIG. 7), such that the computer can control the second light sources 220 and 250 based on the acquired data to fully cure and smooth the printed object 224 connected to the print surface 214A of the rigid base 214. Each of the second light sources emits light 226 and 256, respectively, to the printed object 224 connected to the print surface 214A of the rigid base 214 to fully cure and smooth the printed object 224.

The 3D printing system and method can include any suitable number of second light sources. For example, similarly to the 3D printing system and method of FIGS. 9 and 10, the 3D printing system and method can include three second light sources. Each of the three second light sources covers approximately 120 degrees of the printed object.

The 3D printing system and method in accordance with the exemplary embodiments provides a second light source that fully cures and smooths the printed object while the printed object is connected to the print surface of the rigid base, thereby providing a printed object that more accurately corresponds to the model being printed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A 3D printing system:
a vat containing a liquid photopolymer resin;
a rigid base on which an object is configured to be printed;
a control arm connected to the rigid base and configured to move the rigid base relative to the vat;
a first light source configured to emit a first light to the vat to form the object on the rigid base while the rigid base is connected to the control arm; and
a second light source configured to emit a second light to the object on the rigid base to cure the object, the second light source being configured to emit the second light to the object while the object is connected to the rigid base and while the rigid base is connected to the control arm, the second light source being configured to emit the second light to the object when the object is disposed externally of the liquid photopolymer resin in the vat, the second light source being directly connected to a wall of the vat and the second light source being movable along the wall of the vat.

2. The 3D printing system according to claim 1, wherein the liquid photopolymer resin includes monomer and oligomer molecules.

3. The 3D printing system according to claim 2, wherein the liquid photopolymer resin includes first and second photoinitiators.

4. The 3D printing system according to claim 3, wherein the first photoinitiator and the second photoinitiator absorb light energy having different wavelengths.

5. The 3D printing system according to claim 4, wherein the first photoinitiator absorbs light energy having a first wavelength between 360 and 400 nanometers, inclusive.

6. The 3D printing system according to claim 5, wherein the second photoinitiator absorbs light energy having a second wavelength less than 360 nanometers.

7. The 3D printing system according to claim 4, wherein the first photoinitiator is configured to absorb light energy from the first light emitted by the first light source, and the second photoinitiator is configured to absorb light energy from the second light emitted by the second light source.

8. The 3D printing system according to claim 1, further comprising
a sensor configured to acquire data regarding the object being printed.

9. The 3D printing system according to claim 8, wherein the second light source is configured to be controlled based on the data acquired by the sensor.

10. The 3D printing system according to claim 4, wherein the resin includes a light absorbing material to facilitate curing the object.

11. The 3D printing system according to claim 1, wherein the second light source being configured to move relative to the object being printed.

12. The 3D printing system according to claim 1, wherein the second light source is a plurality of second light sources, each of the plurality of second light sources being movably fixed to the vat and configured to move relative to the object being printed.

13. The 3D printing system according to claim 1, wherein the control arm has six degrees of freedom.

14. A method of 3D printing an object, comprising:
guiding a first light from a first light source to a vat containing a liquid photopolymer resin;
curing the liquid photopolymer resin to form a first layer of the object on a rigid base, the rigid base being connected to a control arm configured to move the rigid base relative to the vat;
moving the rigid base connected to the control arm to form a second layer of the object on the first layer; and
emitting a second light from a second light source to cure the object on the rigid base when the object is disposed externally of the liquid photopolymer resin in the vat and while the object is connected to the rigid base and while the rigid base is connected to the control arm, the second light source being movably connected to the vat.

15. The method of 3D printing according to claim 14, wherein
the liquid photopolymer resin includes first and second photoinitiators that absorb light having different wavelengths.

16. The method of 3D printing according to claim 15, wherein
the first photoinitiator absorbs light energy having a first wavelength between 360 and 400 nanometers, inclusive, the first photoinitiator absorbing light energy from the first light emitted by the first light source.

17. The method of 3D printing according to claim 16, wherein
the second photoinitiator absorbs light energy having a second wavelength less than 360 nanometers, the second photoinitiator absorbing light energy from the second light emitted by the second light source.

18. The method of 3D printing according to claim 14, further comprising
acquiring data regarding the object being printed; and
controlling the second light source based on the acquired data.

19. The method of 3D printing according to claim 18, wherein
the second light source is configured to move relative to the object being printed.

20. The method of 3D printing according to claim 14, further comprising
moving the control arm to which the rigid base is connected through six degrees of freedom during 3D printing of the object.

* * * * *